(12) United States Patent
Moteki et al.

(10) Patent No.: US 8,901,500 B2
(45) Date of Patent: Dec. 2, 2014

(54) RADIATION MEASUREMENT SYSTEM

(71) Applicant: Mitsubishi Electric Corporation, Chiyoda-ku (JP)

(72) Inventors: Kenichi Moteki, Osaka (JP); Shohei Katayama, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 13/961,326

(22) Filed: Aug. 7, 2013

(65) Prior Publication Data

US 2014/0291530 A1 Oct. 2, 2014

(30) Foreign Application Priority Data

Apr. 2, 2013 (JP) .................................. 2013-76585

(51) Int. Cl.
*G01T 1/16* (2006.01)
*G01T 1/20* (2006.01)
*G01T 1/185* (2006.01)

(52) U.S. Cl.
CPC . *G01T 1/16* (2013.01); *G01T 1/185* (2013.01); *G01T 1/20* (2013.01)
USPC .......................................................... 250/343

(58) Field of Classification Search
USPC .................... 250/336.1, 343, 361 R
See application file for complete search history.

(56) References Cited

FOREIGN PATENT DOCUMENTS

| JP | 2000-098038 A | 4/2000 |
|----|---------------|--------|
| JP | 2001-153956 A | 6/2001 |
| JP | 2005-009890 A | 1/2005 |

*Primary Examiner* — Mark R Gaworecki
(74) *Attorney, Agent, or Firm* — Buchanan Ingersoll & Rooney

(57) ABSTRACT

In order to obtain a radiation measurement system in which a shield is reduced in size to achieve reduction in cost and missing measurement is not present in the whole measurement range, and which is good in stability and responsiveness, a radiation detector which is low in measurement range of radiation is arranged in a sample vessel in which a sample gas serving as a radiation measurement object is made to flow; a radiation detector, which is high in measurement range having a measurement range that follows the radiation detector which is low in measurement range of radiation, is arranged outside the sample vessel; and the sample vessel and a plurality of the radiation detectors are surrounded by a shield to shield from environmental radiation.

9 Claims, 5 Drawing Sheets

RADIATION MEASUREMENT SYSTEM

BACKGROUND OF THE INVENTION

1. Field of the Invention

The present invention relates to a radiation measurement system which monitors radiation in nuclear facilities, in nuclear waste material reprocessing facilities, and the like.

2. Description of the Related Art

A conventional radiation measurement system includes: a first sample vessel of large volume, in which a sample serving as a radiation measurement object is made to flow; a second sample vessel of small volume; a radiation detector which detects a gamma ray emitted from a radioactive material in the flowing sample; a shield which surrounds these components to shield the radiation detector from environmental radiation; and a measurement unit to which a detection signal output from the radiation detector is input, and which measures radiation. In the radiation measurement system, there is proposed a method in which arrangement is made in the order of the second sample vessel of small volume (high concentration measurement vessel), a collimator, the first sample vessel of large volume (low concentration measurement vessel), and the radiation detector in a face-to-face relation; the flow of the first and the second sample vessels are automatically switched by a solenoid valve at a predetermined radiation measurement value to measure radiation in a wide range (see Patent Document 1).

Furthermore, as for a conventional radiation measurement system, there is proposed a device in which a movable collimator having an inner diameter equivalent to a radiation detector is arranged between a sample vessel and the radiation detector and a shield which incorporates and surrounds these components to shield the radiation detector from environmental radiation is provided. In the radiation measurement system, the movable collimator is made to be close to the radiation detector so as not to disturb measurement during a low range; and the movable collimator is made to be close to the sample vessel in order to narrow down the number of radiation incident on the radiation detector per unit time during a high range to measure radiation in a wide range (see Patent Document 2).

[Patent Document 1] Japanese Unexamined Patent Publication No. 2001-153956 (FIG. 1)

[Patent Document 2] Japanese Unexamined Patent Publication No. 2005-9890 (FIG. 1, FIG. 2)

The conventional radiation measurement systems are thus configured; and accordingly, a problem exists in that when the flow is switched from the large first sample vessel to the small second sample vessel, the method of switching the sample vessels performs purge of the large first sample vessel and therefore missing measurement is present therebetween. Furthermore, in the movable collimator system, a problem exists in that when it is tried to enlarge a measurement range, a movement distance of the movable collimator needs to be increased and accordingly the shield increases in size. Besides, measurement result is unstable during the movement of the movable collimator and thus there is a problem in stability and responsiveness of a high range area required for short-time response. Further, the movable collimator of heavy material is made to move and therefore a structure and a mechanism are complicated; and precision is required so that the accuracy of a stop position does not have an affect on a measurement error and therefore there is a problem in costs.

SUMMARY OF THE INVENTION

The present invention has been made to solve the foregoing problem, and an object of the present invention is to provide a radiation measurement system in which a shield is reduced in size to reduce costs, missing measurement is not present in the whole measurement range, and stability and responsiveness are good.

According to the present invention, there is provided a radiation measurement system including: a sample vessel in which a sample gas serving as a radiation measurement object is made to flow; a plurality of radiation detectors which detect a gamma ray emitted from a radioactive material in the sample gas that flows in the sample vessel; a shield which surrounds the sample vessel and the plurality of the radiation detectors to shield from environmental radiation; and a plurality of measurement units to which detection signals output from the plurality of the radiation detectors are input respectively, and which measure radiation. The radiation measurement system includes: a detector tube which is arranged in the sample vessel, and constitutes a boundary of the sample vessel; a radiation detector which is low in measurement range of radiation is arranged in the detector tube; and a radiation detector, which is high in measurement range having a measurement range that follows the radiation detector which is low in measurement range of radiation, is arranged outside the sample vessel.

According to the radiation measurement system of the present invention, there can be provided the radiation measurement system in which the shield can be reduced in size as a whole and therefore reduction in cost can be achieved, in which missing measurement is not present during switching of the measurement range, and which is a wide range that is good in stability and responsiveness.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1A is a top view thereof, and FIG. 1B is a sectional view thereof;

FIG. 4A is a top view thereof, and FIG. 4B is a sectional view thereof; FIG. 5A is a top view thereof, and FIG. 5B is a sectional view thereof.

DETAILED DESCRIPTION OF THE PREFERRED EMBODIMENTS

Embodiment 1.

Figure 1A:
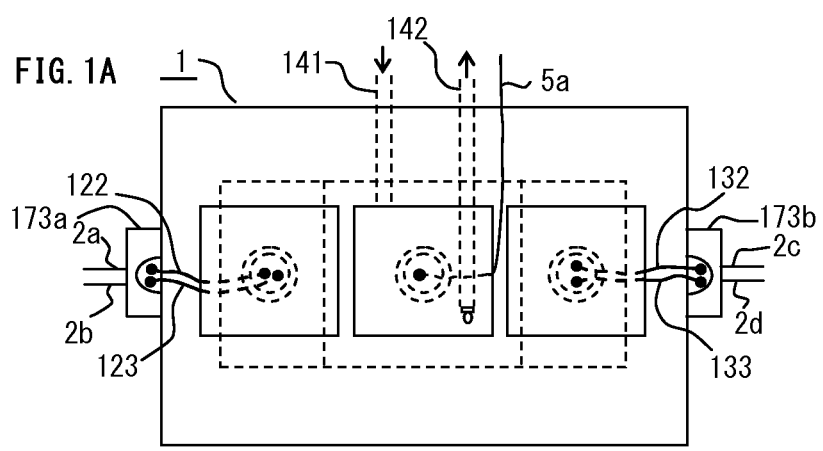
FIGS. 1A and 1B are configuration views each showing a radiation measurement system according to Embodiment 1 of the present invention.
Figure 1B:
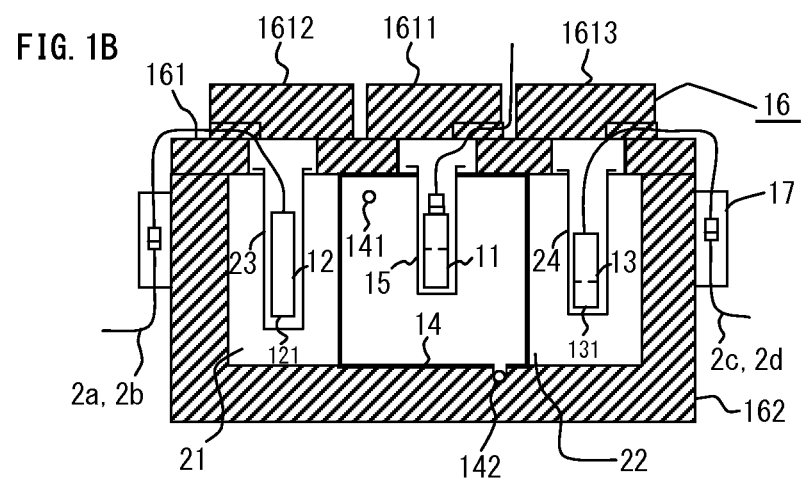
Figure 2:
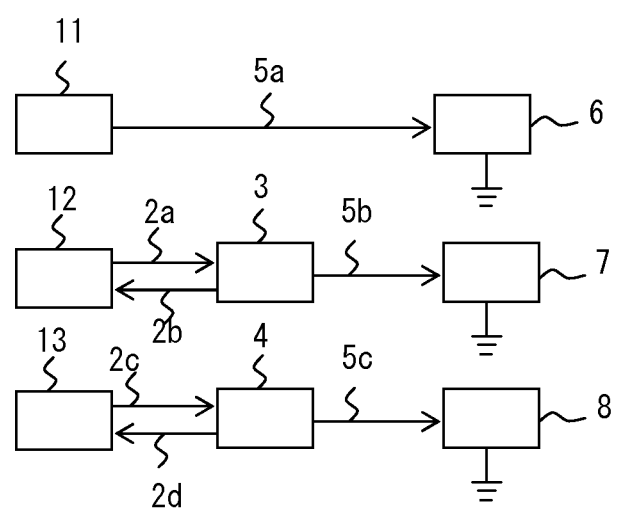
FIG. 2 is a configuration view of a measurement system in the radiation measurement system of Embodiment 1.

Embodiment 1 of the present invention will be described with drawings. FIGS. 1A and 1B are configuration views each showing a radiation measurement system according to Embodiment 1 of the present invention; FIG. 1A is a top view thereof; and FIG. 1B is a sectional view thereof. Incidentally, FIGS. 1A and 1B show without measurement units. FIG. 2 is a configuration view of a measurement system in the radiation measurement system of Embodiment 1. In FIGS. 1A and 1B, a detection unit 1 includes a low range radiation detector 11, a medium range radiation detector 12, a high range radiation detector 13, a sample vessel 14, a detector tube 15, a shield 16, and a supplemental structure 17.

The low range radiation detector 11 is, for example, an NaI(Tl) scintillation detector, which absorbs energy of an incident gamma ray and outputs an analog voltage pulse signal of a crest value proportional to the energy. The medium range radiation detector 12 is an ionization chamber 121 and the high range radiation detector 13 is an ionization chamber 131; a high voltage is applied to each of the ionization chambers 121 and 131 between a high voltage electrode and a signal electrode; and each of the ionization chambers 121 and 131 collects electrons and ions generated as a result of ionization of filled gas by the incident gamma ray, and outputs an ionization current signal from the signal electrode. In the medium range radiation detector 12, the ionization current signal is output from a mineral insulated (MI) cable 122 in which a metal sheath is welded to the ionization chamber 121; and the high voltage is supplied from an MI cable 123 in which a metal sheath is welded to the ionization chamber 121. Similarly, in the high range radiation detector 13, the ionization current signal is output from an MI cable 132 in which a metal sheath is welded to the ionization chamber 131; and the high voltage is supplied from an MI cable 133 in which a metal sheath is welded to the ionization chamber 131.

The ionization chambers 121 and 131 are each composed of metal, inorganic insulators, and filled gas, and are stably operated, for example, up to 200° C. in an environment of high temperature and high humidity, assuming severe accident. The MI cables 122, 123, 132, and 133 are each of a coaxial structure insulated by filling magnesium oxide between a central core and the metal sheath, or a three coaxial structure mutually insulated by similarly filling magnesium oxide by the addition of an internal sheath serving as an internal shield between the core and the metal sheath; and the MI cables endure a severe environment as in the ionization chambers 121 and 131.

The sample vessel 14 is a well type shape; a sample gas of a measurement object is introduced from an inlet nozzle 141 to the sample vessel 14 and is exhausted from an outlet nozzle 142. Arrows of FIG. 1 show the flow direction of the sample gas. The detector tube 15 is arranged on the same axis as a center axis (a vertical axis passing through an intersection point of diagonal lines of cross section of the sample vessel) in the sample vessel 14 and constitutes a boundary of the sample vessel 14. The NaI(Tl) scintillation detector serving as the low range radiation detector 11 which is the highest in detection sensitivity (that is, low in measurement range of radiation) is arranged inside the detector tube 15. In addition to the sample vessel 14, detector chambers 21 and 22 serving as spaces which are surrounded by the sample vessel 14 and the shield 16 and are for arranging the detectors are provided inside the shield 16. The ionization chamber 121 serving as the medium range radiation detector 12 whose measurement range of radiation is moderate and the ionization chamber 131 serving as the high range radiation detector 13 whose measurement range of radiation is high are arranged in the detector chambers 21 and 22, respectively, the detector chambers 21 and 22 being located near outside the sample vessel 14. A detector tube 23 is arranged on a central axis in the detector chamber 21 and the medium range radiation detector 12 is arranged inside the detector tube 23. Similarly, a detector tube 24 is arranged on a central axis in the detector chamber 22 and the high range radiation detector 13 is arranged inside the detector tube 24. Each of the detectors 11, 12, and 13 detects a gamma ray emitted from a radioactive nuclide included in the sample gas. Incidentally, in FIGS. 1A and 1B, the sample vessel 14 and the detector chambers 21 and 22 are each shown as a rectangular shaped vessel; however, a cylindrical shaped vessel may be permissible.

Figure 3:
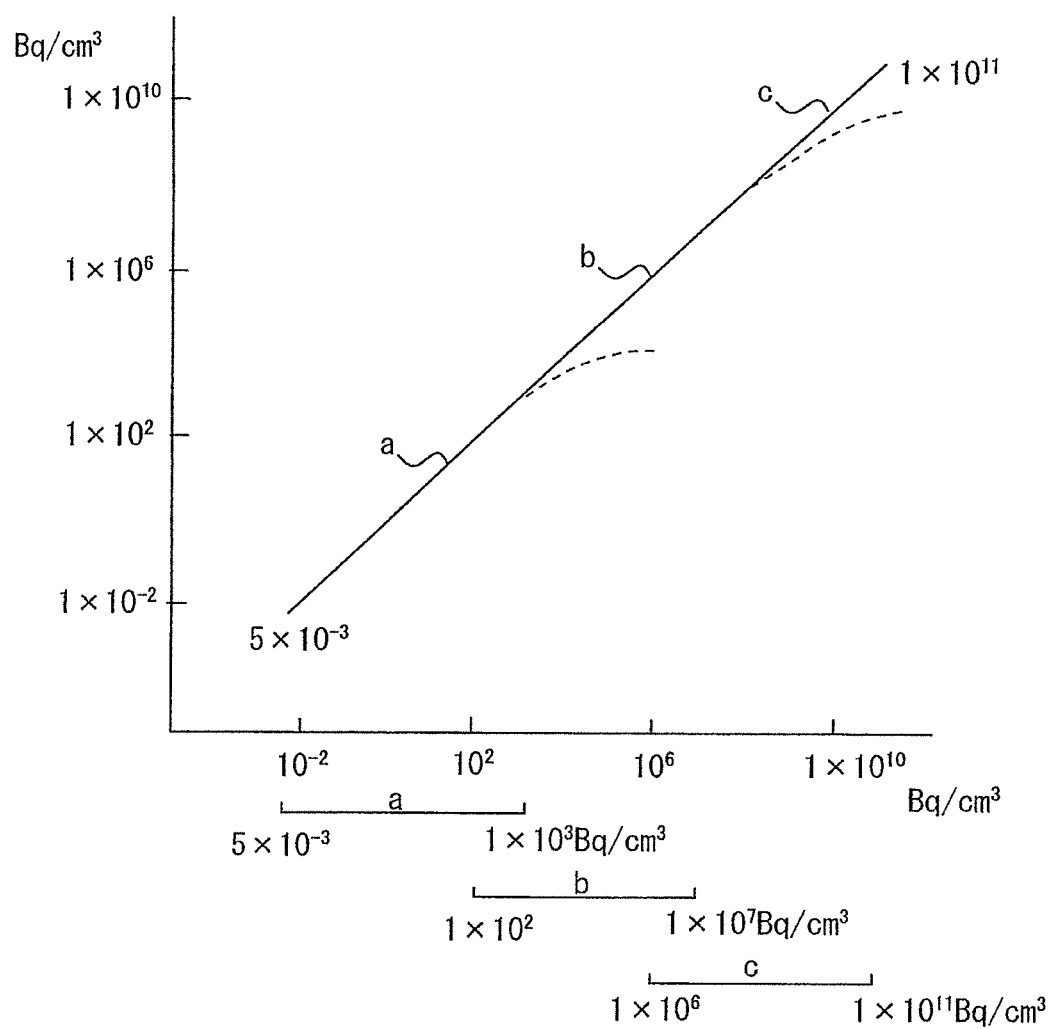
FIG. 3 is a view showing measurement range distribution of the radiation measurement system according to Embodiment 1.

FIG. 3 is a view showing the measurement range distribution of the radiation measurement system according to Embodiment 1. As shown in FIG. 3, measurement ranges are made to overlap approximately 0.5 to 1 decade to share each upper measurement range in turn, thereby covering the necessary whole measurement range. For example, in the case where the whole measurement range is $5 \times 10^{-3}$ to $1 \times 10^{11}$ Bq/cm$^3$, $5 \times 10^{-3}$ to $1 \times 10^3$ Bq/cm$^3$ of (a) is shared by the NaI(Tl) scintillation detector serving as the low range radiation detector 11; $1 \times 10^2$ to $1 \times 10^7$ Bq/cm$^3$ of (b) is shared by the ionization chamber 121 serving as the medium range radiation detector 12; and $1 \times 10^6$ to $1 \times 10^{11}$ Bq/cm$^3$ of (c) is shared by the ionization chamber 131 serving as the high range radiation detector 13. The NaI(Tl) scintillation detector, the ionization chamber 121, and the ionization chamber 131 are insulated from mounting portions respectively and are fixed inside the shield 16.

The shield 16 uses a high density material such as tungsten or lead and includes an upper shield 161 and a lower shield 162, which surround the NaI(Tl) scintillation detector serving as the low range radiation detector 11, the ionization chamber 121, the ionization chamber 131, the sample vessel 14, and the detector chambers 21 and 22 to shield from environmental radiation. Maintenance shields 1611, 1612, and 1613 (constituting the upper shield 161) for the respective detectors are lifted or are made to slide in the case of having a slide mechanism when taking out the low range radiation detector 11 from the sample vessel 14, the medium range radiation detector 12 from the detector chamber 21, and the high range radiation detector 13 from the detector chamber 22. In a severe environment at the time of an accident, the concentration of the radioactive nuclide in the sample gas is elevated; and in line with that, the level of the environmental radiation is also elevated. Therefore, for example, the shield 16 is a thickness in which the level of the environmental radiation is made to be reduced to approximately two to three digits so that the environmental radiation does not have an affect on radioactivity measurement of the sample gas. Incidentally, the shield 16 may be reduced in weight by trimming away a surplus portion of corners.

Referring to FIG. 2, the analog voltage pulse signal output from the low range radiation detector 11 is transmitted to a low range measurement unit 6 by a composite cable with a shield 5a. The low range measurement unit 6 displays by measuring a count rate and supplies a high voltage serving as a bias voltage to the low range radiation detector 11 via the composite cable 5a. Incidentally, the low range measurement unit 6 may display by converting into other engineering value in place of the count rate.

The MI cables 122 and 123 of the medium range radiation detector 12 are taken from the shield 16 and are connected to a medium range signal converter 3 by shield cables 2a and 2b, respectively. A connection portion protection chamber 173a is provided for protecting connector connection portions of the MI cables 122 and 123 and the shield cables 2a and 2b. The medium range signal converter 3 converts a transmitted ionization current into, for example, a voltage proportional to the logarithm of the current, outputs its voltage signal to a medium range measurement unit 7 via a composite cable 5b, and relays a high voltage from the medium range measurement unit 7. The voltage signal output from the medium range signal converter 3 is input to the medium range measurement unit 7, which displays by converting into an engineering value and supplies a high voltage serving as a bias voltage to the medium range radiation detector 12 via the shield cable 2b. Incidentally, the engineering value to be displayed by the medium range measurement unit 7 is a current, a dose rate, and the like.

Similarly, the MI cables 132 and 133 of the high range radiation detector 13 are taken from the shield 16 and are connected to a high range signal converter 4 by shield cables 2c and 2d, respectively. A connection portion protection chamber 173b is provided for protecting connector connection portions of the MI cables 132 and 133 and the shield cables 2c and 2d. The high range signal converter 4 converts a transmitted ionization current into, for example, a voltage proportional to the logarithm of the current, outputs its voltage signal to a high range measurement unit 8 via a composite cable 5c, and relays a high voltage to be supplied from the high range measurement unit 8 to the high range radiation detector 13 via the composite cable 5c. The voltage signal output from the high range signal converter 4 is input to the high range measurement unit 8, which displays by converting into an engineering value and supplies a high voltage serving as a bias voltage to the high range radiation detector 13 via the shield cable 2d. Incidentally, the engineering value to be displayed by the high range measurement unit 8 is a current, a dose rate, and the like.

The low range radiation detector 11, the medium range radiation detector 12, and the high range radiation detector 13 are made to appropriately overlap to share each upper measurement range in turn, the radioactive concentration of the sample gas is assumed to increase depending on the extent of accident, and the temperature of the sample gas is also assumed to rise together with the radioactive concentration. The NaI(Tl) scintillation detector serving as the low range radiation detector 11 can deal with up to maximum 80° C.; and the ionization chambers serving as the medium range radiation detector 12 and the high range radiation detector 13 can deal with up to approximately maximum 200° C.

As described above, there generally exists a large sensitivity difference of approximately five digits between the NaI (Tl) scintillation detector 11 and the ionization chamber 12 or 13; and a sensitivity difference of several digits between the ionization chambers themselves can be easily achieved by changing gas pressure and gas types. Therefore, the sample gas in the same sample vessel is served as a common measurement object and different detectors are arranged close to the measurement object; and consequently, a wide range can be easily achieved.

Furthermore, the shields 16 are shared to reduce the total number of the shields 16, and the volume of the sample gas of the measurement object in connection with switching of the measurement range is not changed, further measurement is made under measurement conditions fixed so as not to change a solid angle formed between the detector and the measurement object; and therefore, there can be provided the radiation measurement system in which low cost is achieved and missing measurement is not present, and which is a wide range that is good in stability and responsiveness. Furthermore, the link between shared ranges is made to overlap; and therefore, soundness of range succession can be confirmed. Further, handling is made by the ionization chambers for the sample gas of high concentration and high temperature at the time of a hypothetical accident; and therefore, stable measurement can be performed even at the time of an accident.

Embodiment 2.

Figure 4A:
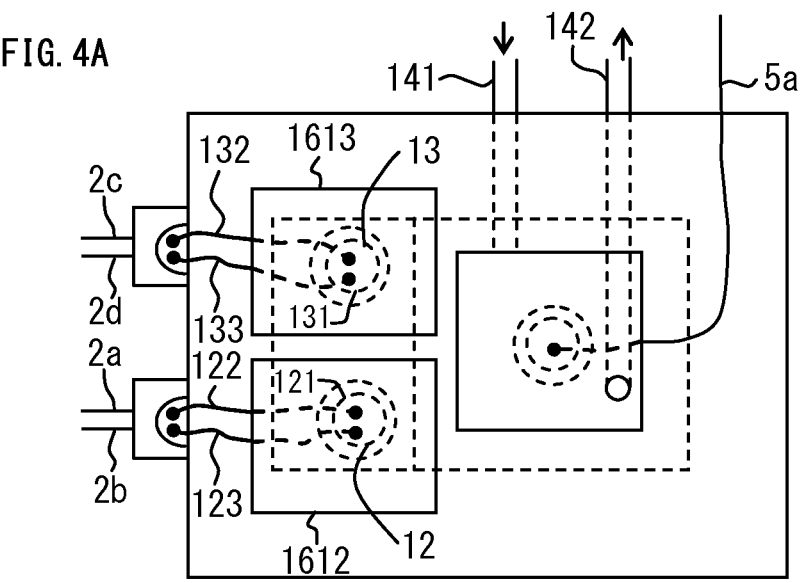
FIGS. 4A and 4B are configuration views each showing a radiation measurement system according to Embodiment 2.
Figure 4B:
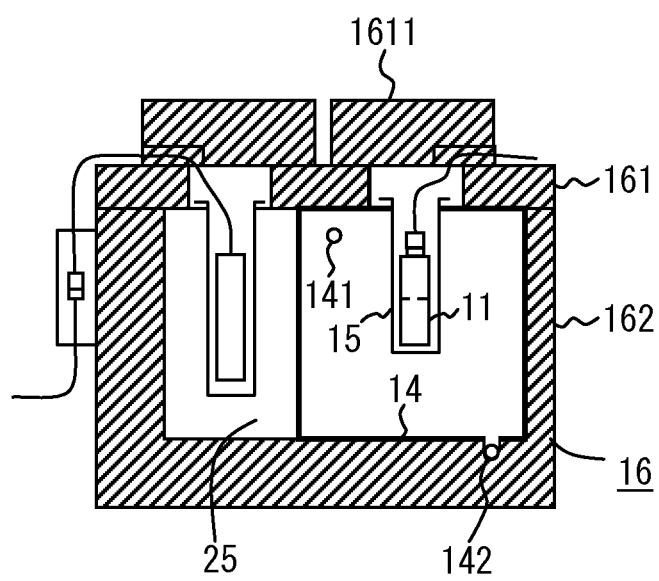

Incidentally, the ionization chamber 121 serving as the medium range radiation detector 12 and the ionization chamber 131 serving as the high range radiation Detector 13 are arranged in a dispersed manner near both sides outside the sample vessel 14 in Embodiment 1; however, in Embodiment 2, as shown in FIGS. 4A and 4B, ionization chambers 121 and 131 are arranged by approaching to near one side outside a sample vessel 14; and consequently, an effect is achieved that a shield 16 made of lead or the like can be further reduced in size. In addition, FIGS. 4A and 4B show without measurement units. The ionization chamber 121 and the ionization chamber 131 are each arranged in a detector chamber 25 adjacent to the sample vessel 14.

Embodiment 3.

Figure 5A:
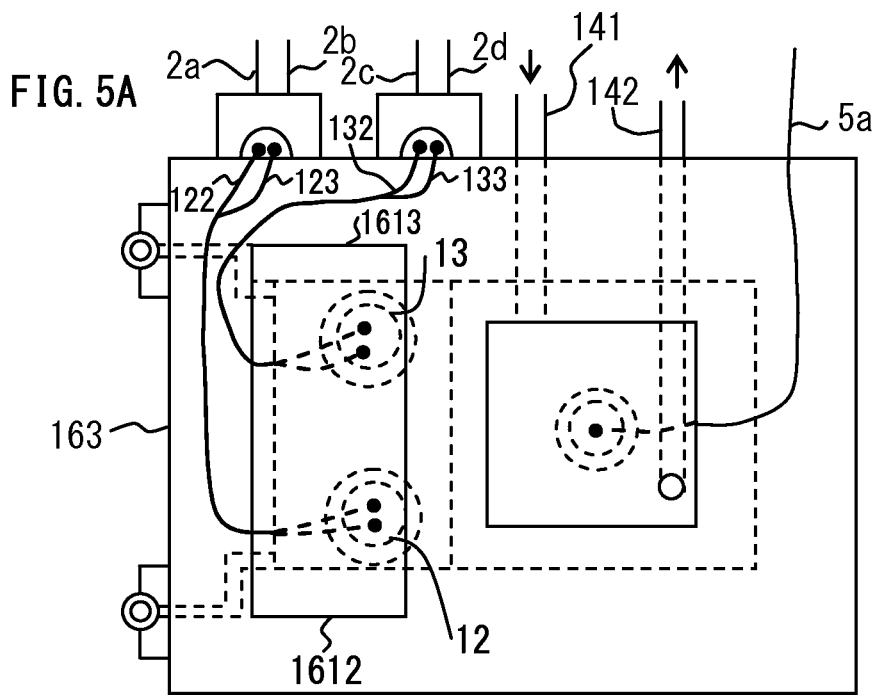
FIGS. 5A and 5B are configuration views each showing a radiation measurement system according to Embodiment 3.
Figure 5B:
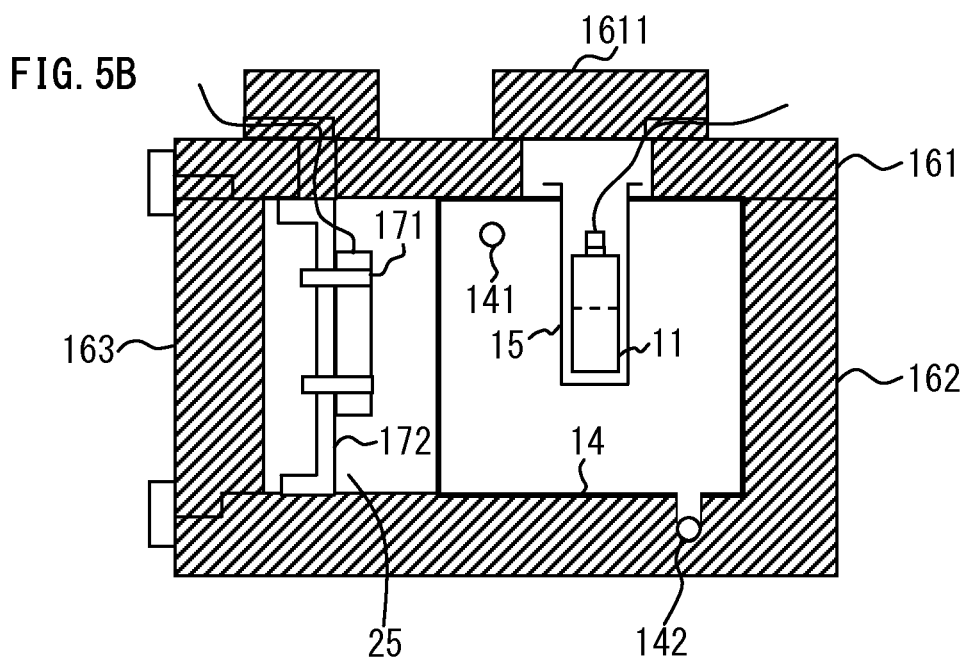

Incidentally, the low range radiation detector 11, the ionization chamber 121, and the ionization chamber 131 are all fixed by being pressed from the upper side and are maintained by lifting or sliding the maintenance shields 1611, 1612, and 1613 in Embodiment 2. However, in Embodiment 3, as shown in FIGS. 5A and 5B, a sidewall of a lower shield 162 of a shield 16, the sidewall being faced to an ionization chamber 121 and an ionization chamber 131, is an openable and closable door shield 163; and the ionization chamber 121 and the ionization chamber 131 are installed from the sidewall so as to be capable of maintaining and inspecting. In addition, FIGS. 5A and 5B show without measurement units. An internal trestle 172 is provided in a detector chamber 25 in which the ionization chamber 121 and the ionization chamber 131 are installed. The ionization chamber 121 and the ionization chamber 131 are firmly fixed to the internal trestle 172 by two fixing blocks 171 that insulate each body of the ionization chambers. The insulation state and the fixing state of the ionization chambers 121 and 131 can be visually confirmed by opening the door shield 163; and therefore, quake resistance and reliability can be increased.

Incidentally, in the present invention, the respective embodiments can be freely combined and appropriately changed or omitted within the scope of the present invention.

What is claimed is:

1. A radiation measurement system comprising:
a sample vessel in which a sample gas serving as a radiation measurement object is made to flow;
a plurality of radiation detectors which detect a gamma ray emitted from a radioactive material in the sample gas that flows in said sample vessel;
a shield which surrounds said sample vessel and the plurality of said radiation detectors to shield from environmental radiation; and
a plurality of measurement units to which detection signals output from the plurality of said radiation detectors are input respectively, and which measure radiation,
wherein said radiation measurement system includes:
a detector tube which is arranged in said sample vessel, and constitutes a boundary of said sample vessel;
a first radiation detector having a first measurement range of radiation strength is arranged in said detector tube; and
a second radiation detector, having a second measurement range of radiation strength in which at least part of the second measurement range of radiation strength is higher than said first measurement range of radiation strength, is arranged outside said sample vessel.

2. The radiation measurement system according to claim 1, wherein said sample vessel is a well type, and
said detector tube is arranged on a center axis in said sample vessel.

3. The radiation measurement system according to claim 2, wherein said second radiation detector arranged outside said sample vessel is provided in plural numbers; and the plurality of said second radiation detectors are all arranged on one side outside said sample vessel.

4. The radiation measurement system according to claim 3, wherein said shield has a sidewall which is an openable and closable door structure, the sidewall being faced to said first and second radiation detectors arranged on one side outside said sample vessel; and said first and second radiation detectors are arranged by being fixed by a fixing block that insulates each body portion of said first and second radiation detectors on one side outside said sample vessel.

5. The radiation measurement system according to claim 1, wherein said first radiation detector arranged in said detector tube is an NaI(TI) scintillation detector, and measures the radiation strength by measuring an analog voltage pulse signal output from said NaI(TI) scintillation detector; and said second radiation detector arranged outside said sample vessel is an ionization chamber, and measures the radiation strength by measuring an ionization current signal output from said ionization chamber.

6. The radiation measurement system according to claim 5, wherein said second radiation detector arranged outside said sample vessel is provided in plural numbers; and the plurality of said second radiation detectors are all arranged on one side outside said sample vessel.

7. The radiation measurement system according to claim 6, wherein said shield has a sidewall which is an openable and closable door structure, the sidewall being faced to said first and second radiation detectors arranged on one side outside said sample vessel; and said first and second radiation detectors are arranged by being fixed by a fixing block that insulates each body portion of said first and second radiation detectors on one side outside said sample vessel.

8. The radiation measurement system according to claim 1, wherein said second radiation detector arranged outside said sample vessel is provided in plural numbers; and the plurality of said second radiation detectors are all arranged on one side outside said sample vessel.

9. The radiation measurement system according to claim 8, wherein said shield has a sidewall which is an openable and closable door structure, the sidewall having said first and second radiation detectors arranged on one side outside said sample vessel; and said radiation detectors are arranged by being fixed by a fixing block that insulates each body portion of said radiation detectors on one side outside said sample vessel.

* * * * *